US011408315B2

(12) United States Patent
Delevallee et al.

(10) Patent No.: US 11,408,315 B2
(45) Date of Patent: Aug. 9, 2022

(54) DEVICE FOR INJECTING A FLUID INTO AN EXHAUST PIPE AND ASSOCIATED EXHAUST SYSTEM

(71) Applicant: FAURECIA SYSTEMES D'ECHAPPEMENT, Nanterre (FR)

(72) Inventors: Jean-Louis Delevallee, Mamirolle (FR); Jonathan Canteloube, Belfort (FR); Ludovic Pertuis, Etuz (FR); Julien Roussilhe, Dorans (FR)

(73) Assignee: FAURECIA SYSTEMES D'ECHAPPEMENT

( * ) Notice: Subject to any disclaimer, the term of this patent is extended or adjusted under 35 U.S.C. 154(b) by 0 days.

(21) Appl. No.: 17/551,275

(22) Filed: Dec. 15, 2021

(65) Prior Publication Data

US 2022/0195906 A1 Jun. 23, 2022

(30) Foreign Application Priority Data

Dec. 17, 2020 (FR) ..................................... 20 13537

(51) Int. Cl.
*F01N 3/00* (2006.01)
*F01N 3/20* (2006.01)

(52) U.S. Cl.
CPC ........ *F01N 3/2066* (2013.01); *F01N 2510/02* (2013.01); *F01N 2610/02* (2013.01); *F01N 2610/10* (2013.01); *F01N 2610/1453* (2013.01); *F01N 2610/1486* (2013.01)

(58) Field of Classification Search
CPC ............... F01N 3/2066; F01N 2610/02; F01N 2610/10; F01N 2610/1453; F01N 2610/1486; F01N 2610/107; F01N 3/10; F01N 9/00

USPC .......................................................... 60/282
See application file for complete search history.

(56) References Cited

U.S. PATENT DOCUMENTS

| 11,255,243 B1* | 2/2022 | Kinnaird ............... F01N 3/2066 |
| 2007/0119153 A1* | 5/2007 | Pierz ....................... B01D 53/90 60/286 |
| 2011/0197850 A1* | 8/2011 | Kawano ................. F02M 31/18 123/294 |

(Continued)

FOREIGN PATENT DOCUMENTS

| DE | 102006049591 A1 | 5/2007 |
| DE | 102007034314 A1 | 1/2009 |
| DE | 102014209373 A1 | 11/2015 |

OTHER PUBLICATIONS

Preliminary Search Report for French Application No. 20 13537 dated Jun. 4, 2021.

*Primary Examiner* — Jason D Shanske
(74) *Attorney, Agent, or Firm* — Carlson, Gaskey & Olds, P.C.

(57) ABSTRACT

The device for injecting a fluid into an exhaust pipe comprises a fluid reservoir, an enclosure delimiting a fluid heating chamber, and a first injection system configured to inject the fluid from the reservoir into the heating chamber. At least one heating element extends at least partially into the heating chamber and is intended to be in contact with the fluid, with the at least one heating element being configured to heat the fluid. A second injection system is configured to inject the heated fluid from the heating chamber into the exhaust pipe.

10 Claims, 5 Drawing Sheets

(56) References Cited

U.S. PATENT DOCUMENTS

2014/0116032 A1\* 5/2014 Yetkin ................... F01N 3/2066
239/585.1
2016/0305298 A1\* 10/2016 Murst ................... F01N 3/2066

\* cited by examiner

DEVICE FOR INJECTING A FLUID INTO AN EXHAUST PIPE AND ASSOCIATED EXHAUST SYSTEM

CROSS-REFERENCE TO RELATED APPLICATIONS

This application is a U.S. non-provisional application claiming the benefit of French Application No. 20 13537, filed on Dec. 17, 2020, which is incorporated herein by reference in its entirety.

TECHNICAL FIELD

The present disclosure relates to a device for injecting a fluid into an exhaust pipe of a vehicle.

BACKGROUND

Such an injection device allows the fluid to be nebulized before it is introduced into the exhaust pipe. To do this, the fluid is heated inside an enclosure whose end at which it communicates with the exhaust pipe is closed by a valve. During heating, the pressure inside the chamber increases. Above a certain pressure, the opening of the valve forces a powerful jet of fine fluid droplets from inside the enclosure to the exhaust pipe.

To heat the fluid, a heater can be placed outside the enclosure. The enclosure then transfers the heat from the heater to the fluid to heat it.

However, with such an injection device, the heating of the fluid remains inefficient. Indeed, some heat is lost in the heating of the enclosure itself.

SUMMARY

The disclosure provides a fluid injection device in which the heating of the fluid is efficient.

To this end, the disclosure relates to a device for injecting a fluid into an exhaust pipe, comprising:
  a fluid reservoir;
  an enclosure delimiting a fluid heating chamber;
  a first injection system configured to inject the fluid from the fluid reservoir into the fluid heating chamber;
  at least one heating element extending at least partially into the fluid heating chamber and being intended to be in contact with the fluid, the at least one heating element being configured to heat the fluid; and
  a second injection system configured to inject the heated fluid from the fluid heating chamber into the exhaust pipe.

With the disclosure, the fluid is heated directly by the heating elements without the need to heat an intermediate element such as the enclosure. Heat loss is therefore minimized Heating efficiency is improved.

In addition, the integration of the heating elements inside the heating chamber reduces the size of the injection device.

According to other features of the disclosure, taken alone or in any technically feasible combination:
  the injection device comprises a plurality of heating elements;
  the heating elements define heating channels, the fluid being intended to flow through the heating channels;
  each heating element extends in a heating element path which is a circular helix around a helix axis;
  the directions of rotation of each heating element path are the same;
  the injection device comprises tubular dividing walls, each heating element being radially surrounded by two dividing walls separating it from radially adjacent heating elements, the dividing walls contacting said heating element so as to form a helical heating channel between the dividing walls and the heating element;
  each heating element extends in a heating element path which is straight;
  the injection device comprises a thermal insulation element configured to thermally insulate the heating chamber;
  the thermal insulation element comprises a central inner sleeve extending into the heating chamber, the heating element path of each heating element extending around the inner sleeve; and
  each heating element comprises at least one conductive element, a tubular metal jacket surrounding the at least one conductive element and an electrical insulator between the at least one conductive element and the tubular metal jacket.

The disclosure further relates to an exhaust system of a vehicle, comprising a treatment device for catalytic treatment of exhaust gases, an exhaust pipe connected to the treatment device, through which exhaust gases flow, and an injection device as described above, the injection device being arranged to inject fluid into the exhaust pipe upstream of the treatment device.

BRIEF DESCRIPTION OF THE DRAWINGS

Other aspects and advantages of the disclosure will become apparent upon reading the following description, given as an example and referencing the attached drawings, in which.

DETAILED DESCRIPTION

In the following, the terms "upstream" and "downstream" are defined in relation to the general direction of flow D of a fluid. "General" direction means that, at the scale of the injection device, the fluid is intended to flow from upstream to downstream. As will be described below, at a smaller scale, the fluid path can be more complex and is not limited to a straight path from upstream to downstream.

Figure 1:
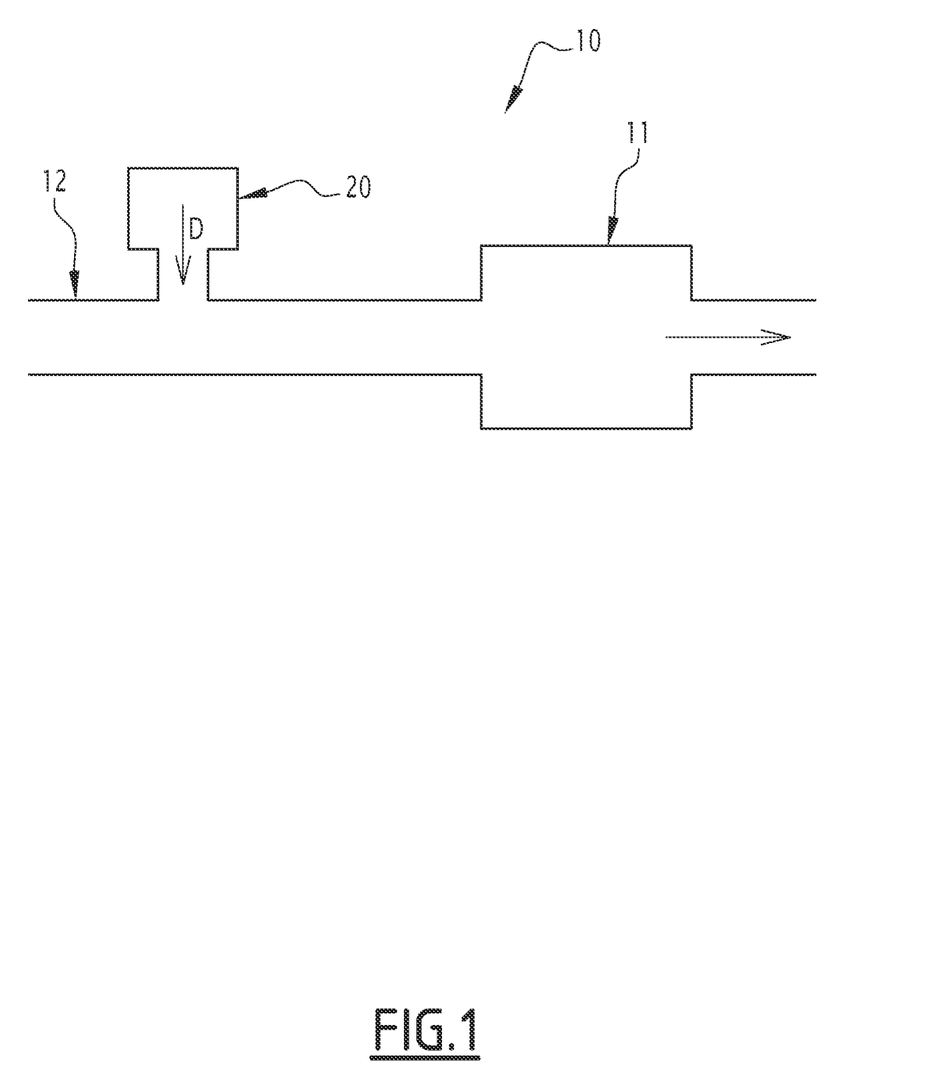
FIG. 1 is a simplified schematic depiction of an exhaust system according to the disclosure.

With reference to FIG. 1, an exhaust system 10 of a vehicle is described.

The vehicle is a land vehicle such as, for example, a motor vehicle or a road transport vehicle.

The exhaust system 10 comprises a treatment device 11 for catalytic treatment of exhaust gas, an exhaust pipe 12 connected to the treatment device 11 and through which exhaust gases flow, and a fluid injection device 20 arranged to inject fluid into the exhaust pipe 12 upstream of the treatment device 11.

The exhaust system 10 comprises, for example, other devices not shown, such as a device for collecting exhaust gases from an engine of the vehicle, a device for catalytic oxidation of exhaust gases, and/or a device for filtering exhaust gases.

The fluid is, for example, a fluid comprising a reducing agent. The reducing agent is, for example, urea. The fluid is then, for example, an aqueous urea solution such as AUS 32 for "Aqueous urea solution", also commonly known as Adblue®, i.e. an aqueous urea solution composed of 32.5% urea and 67.5% demineralized water. In another example, the reducing agent is ammonia. The fluid is intended to participate in a process of selective catalytic reduction of certain pollutants present in the exhaust gases within the treatment device 11.

Figure 2:
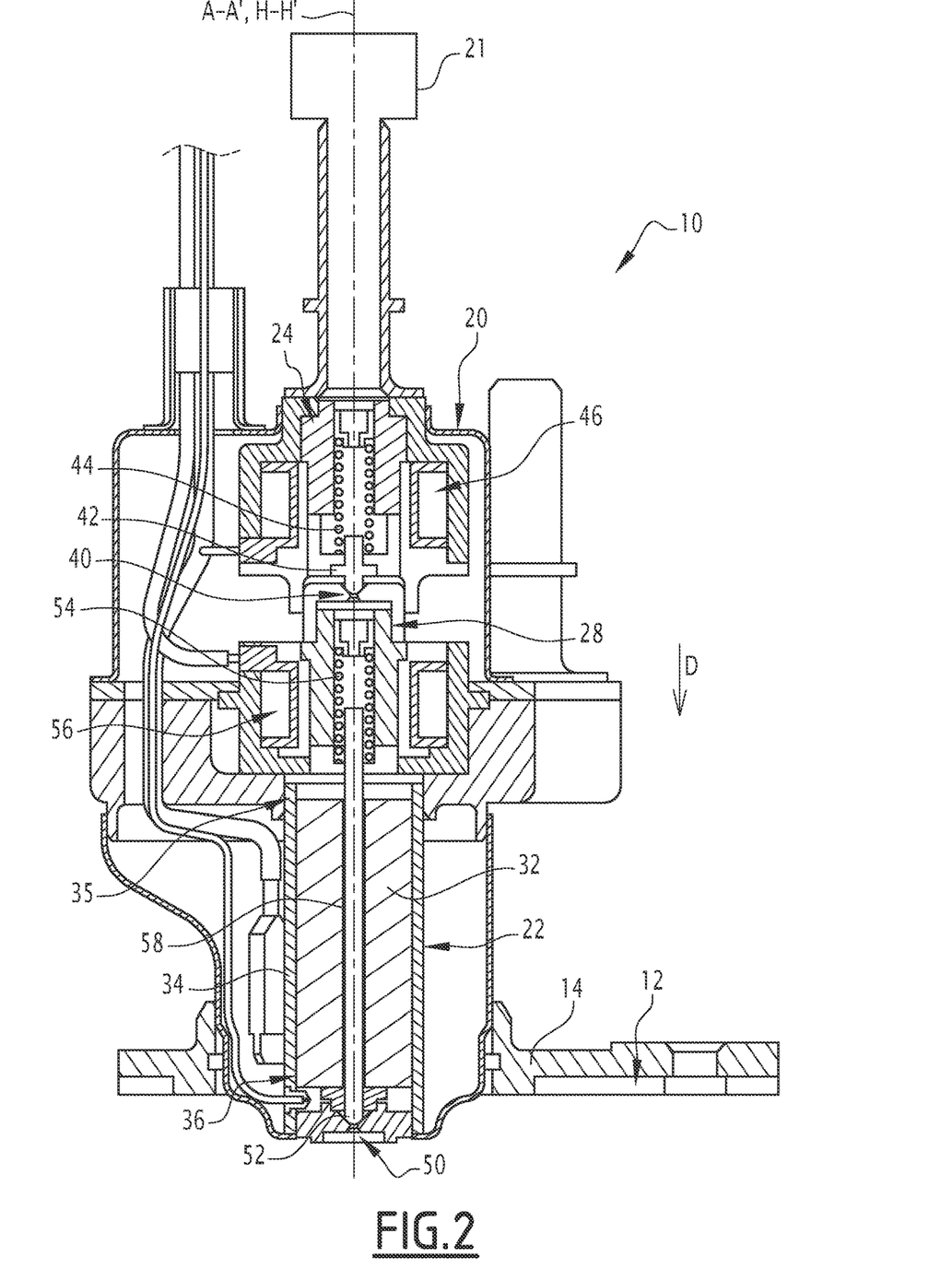
FIG. 2 is a front view of a cross-section of part of a fluid injection device of the exhaust system of FIG. 1, the injection device being mounted on the exhaust pipe.

As shown in FIG. 2, the injection device 20 is attached to the pipe 12 with, for example, an attachment flange 14.

The injection device 20 is, for example, configured to nebulize the fluid into fluid droplets prior to injection into the pipe 12. An average diameter of the fluid droplets is, for example, less than 35 microns. In one embodiment, the injection device 20 is configured to vaporize the fluid prior to injection into the pipe 12. In this way, the fluid is converted to a gaseous state before being injected into the pipe 12.

The injection device 20 comprises a fluid reservoir 21, an enclosure 22, a first injection system 24, at least one heating element 26 (visible in FIGS. 3 to 5) and a second injection system 28.

The at least one heating element 26 has been omitted from FIGS. 1 and 2 for the sake of readability.

Figure 3:
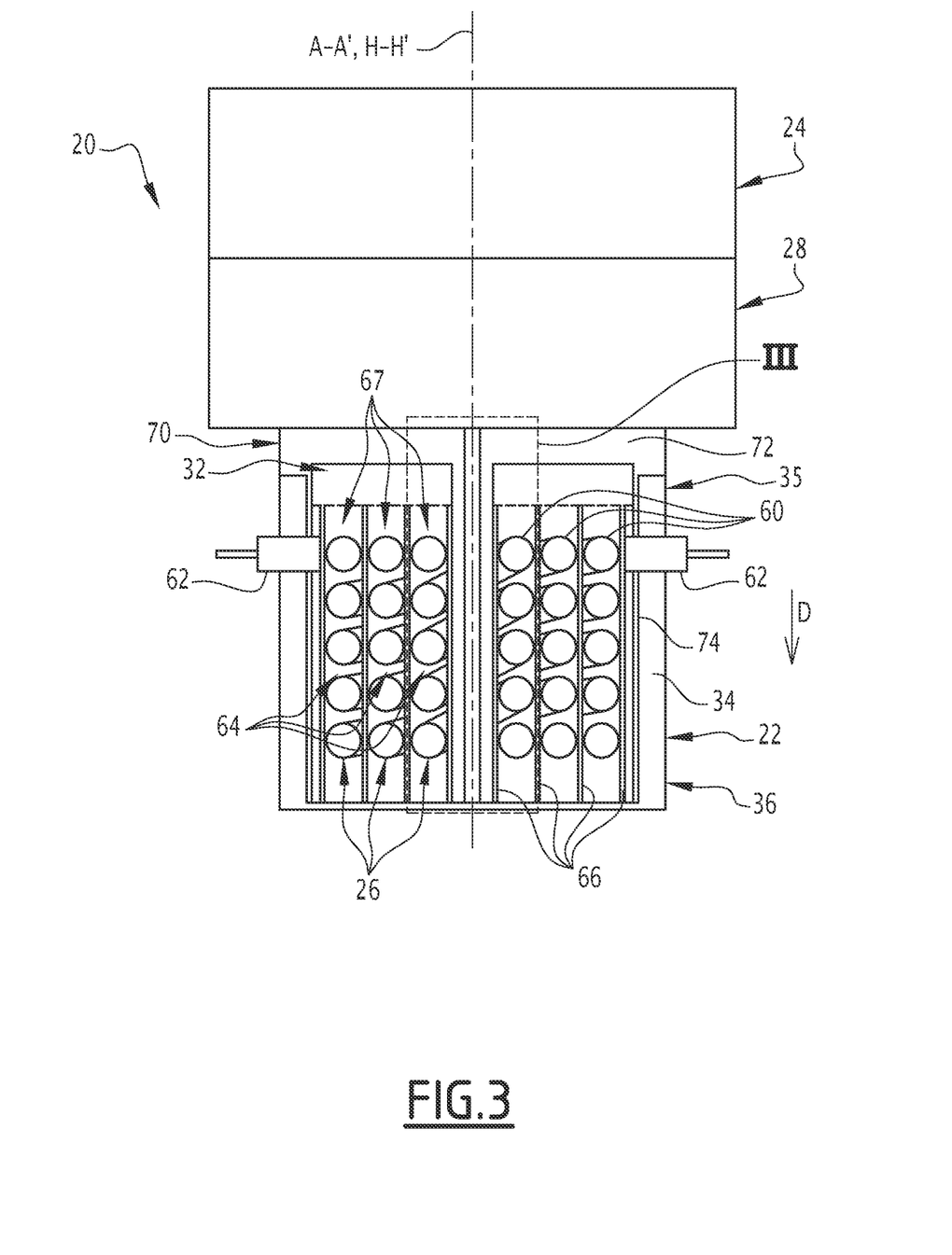
FIG. 3 is a front view of cross-section of part of an injection device according to a first embodiment.
Figure 5:
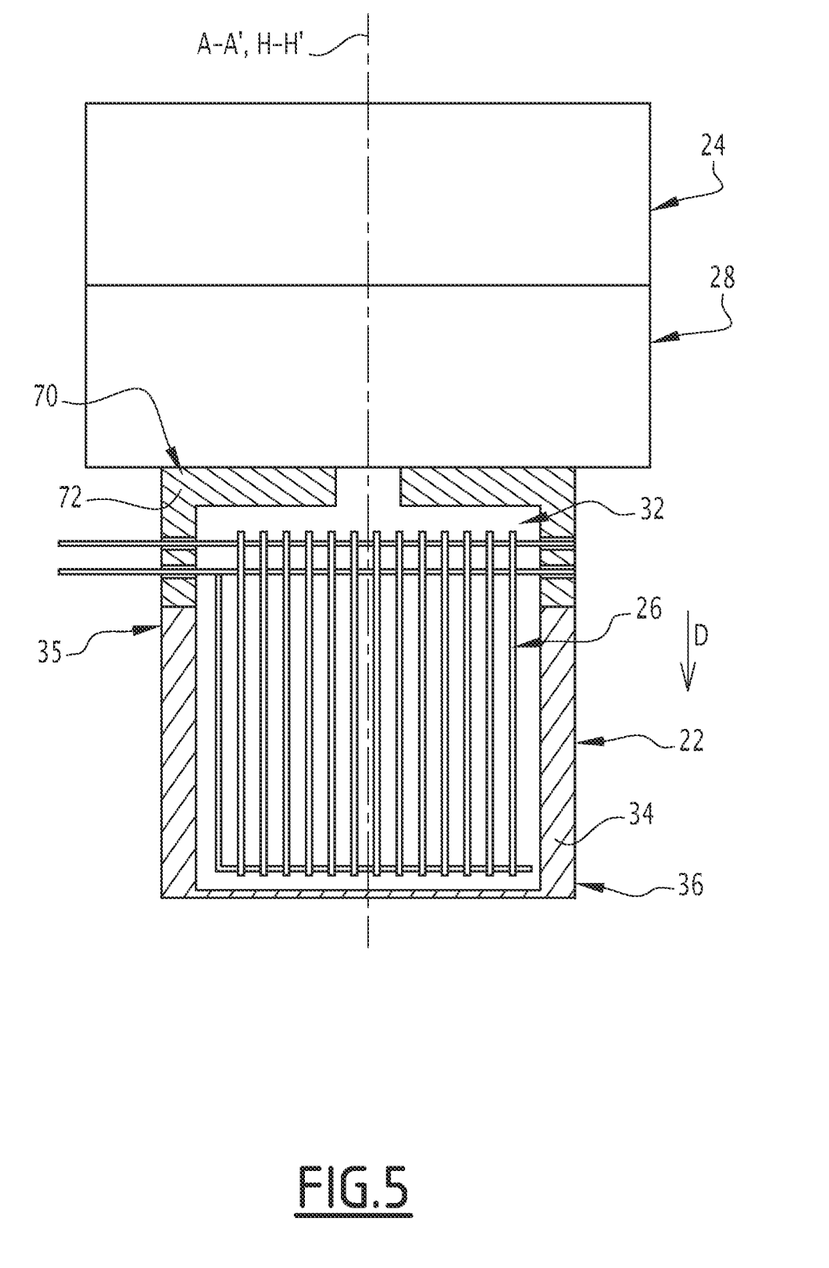
FIG. 5 is a front view of cross-section of part of an injection device according to a second embodiment.

As illustrated in FIGS. 2, 3 and 5, the enclosure 22 defines a fluid heating chamber 32 in which the fluid is intended to be heated.

The enclosure 22 is, for example, closed. As will be described below, however, it includes ports for fluid to enter and exit the heating chamber 32.

For example, the enclosure 22 comprises a tubular outer wall 34 extending around an axis of extension A-A' between an upstream end 35 and a downstream end 36. In such a case, the heating chamber 32 has a cylindrical shape along the extension axis A-A'.

The first injection system 24 is configured to inject fluid from the reservoir 21 into the heating chamber 32.

For example, the first injection system 24 is configured to inject fluid into the heating chamber 32 at the upstream end 35 of the enclosure 22.

The first injection system 24 is, for example, an electromagnetic valve and comprises an injection port 40, a shutter 42, an elastic member 44 and an actuator 46.

The injection port 40 is located upstream of the enclosure 22. The fluid is suitable for injection into the heating chamber 32 through the injection port 40.

The shutter 42 is configured to be moved between a closing position in which the port 40 is closed and a clearing position in which the port 40 is cleared.

The elastic member 44 is configured to bias the shutter 42 into the closing position for plugging the port 40. The elastic member 44 is, for example, a spring capable of exerting a restoring force on the shutter 42 to drive it towards its closing position.

The actuator 46 is configured to move the shutter 42 from the closing position to the clearing position against the restoring force exerted by the elastic member 44.

As shown in FIG. 2, the first injection system 24 is, for example, arranged upstream of the enclosure 22.

Figure 4:
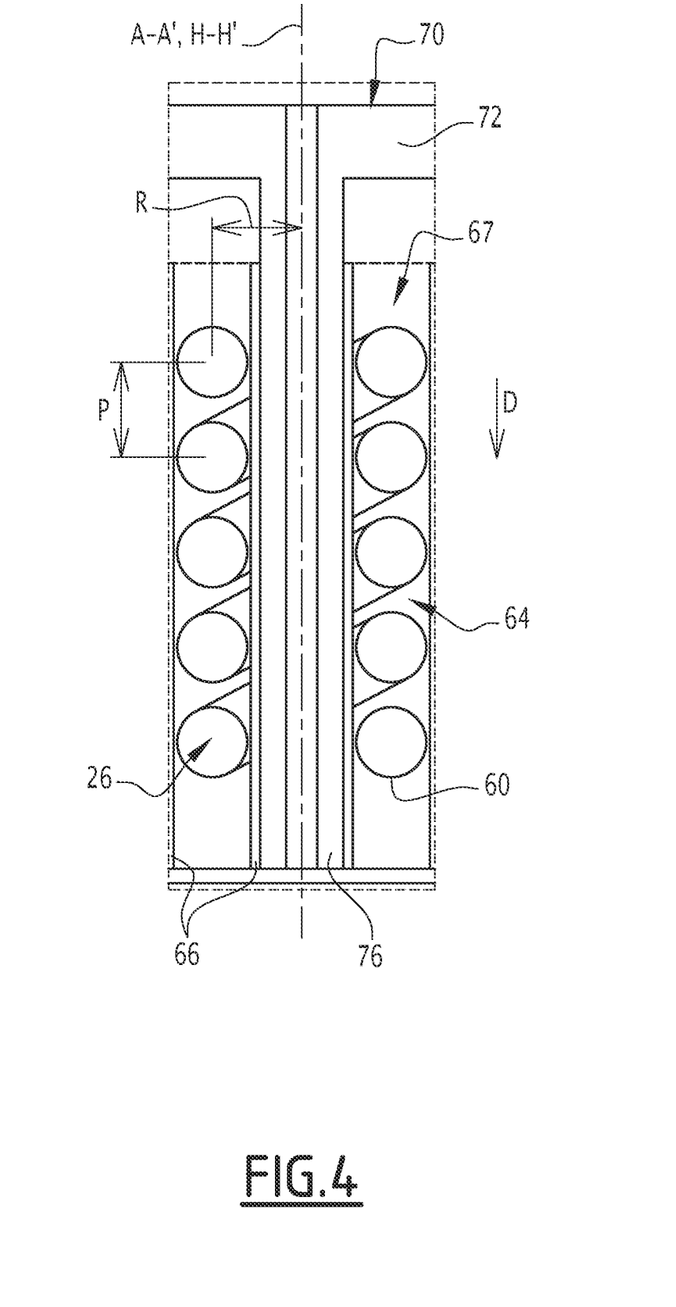
FIG. 4 is an enlarged view of detail III of FIG. 3, showing in particular a heating element extending around the inner sleeve of the thermal insulation element and surrounded by two dividing walls.

With reference to FIGS. 3 to 5, the at least one heating element 26 extends at least partially into the heating chamber 32, is intended to be in contact with the fluid, and is configured to heat the fluid.

In particular, the at least one heating element 26 is configured to heat the fluid injected by the first injection system 24 into the heating chamber 32.

For example, the at least one heating element 26 is intended to heat the fluid to a heating temperature above 20° C., preferably between 20° C. and 500° C. The at least one heating element 26 comprises, for example, at least one conductive element, a tubular metal jacket 60 surrounding the at least one conductive element and an electrical insulator between the at least one conductive element and the jacket 60. The jacket 60 is, for example, made of stainless steel. The electrical insulator is, for example, formed by a magnesium oxide powder. The at least one conductive element is, for example, an electrical wire.

To heat the fluid, the heating element 26 heats up and transfers the heat it produces to the fluid with which it is in contact.

Preferably, only the at least one part of the heating element 26 extending into the heating chamber 32 is configured to heat. In other words, an active part of each heating element 26 is entirely housed in the heating chamber 32.

The at least one heating element 26 further comprises at least one connecting element 62 (visible in FIG. 3) for connecting to a vehicle electrical source for supplying electrical power to said heating element 26. The at least one connecting element 62 is, for example, a free end of the heating element 26. Such a free end is, for example, intended to be attached to a plug of the vehicle's electrical source.

The at least one conductive element is configured to heat up upon the passage of such an electric current.

The at least one conductive element extends into the space bounded by the jacket 60.

The connecting element 62 extends radially through the enclosure 22 from the heating chamber 32 to outside the enclosure 22 towards the electrical source. In order to seal the heating chamber 32, the connecting element 62 is, for example, fixed to the enclosure 22 with a braze.

In an advantageous example, each heating element 26 comprises one and only one connecting element 62. According to this example, the at least one conductive element of each heating element 26 extends from the connecting element 62, loops in the space bounded by the jacket 60 and returns to the connecting element 62. Thus, it is possible to connect the heating element 26 to a single connection plug of the electrical source.

As illustrated in FIGS. 3 to 5, the injection device 20 comprises, for example, a plurality of heating elements 26. Only two connecting elements 62 of a heating element 26 are shown in FIG. 3 for the sake of readability.

For example, as will be described structurally below, the heating elements 26 define heating channels 64, with the fluid intended to flow through the heating channels 64. The heating channels 64 extend, for example, within the heating chamber 32 between the upstream end 35 and the downstream end 36.

The fluid flows between the upstream end 35 and the downstream end 36 in the heating channels 64. Thus, the fluid flows in the general direction of flow D between the upstream end 35 and the downstream end 36.

In a variant, the heating channels 64 extend at least partially in a direction different from the upstream-downstream direction in the heating chamber 32. The fluid then flows in this direction through the heating chamber 32.

According to a first embodiment illustrated in FIGS. 3 and 4, each heating element 26 extends in a heating element path which is a circular helix around a helix axis H-H'. In other words, the heating element path forms a helix. For example, as shown in the figures, the helix axis H-H' is coincident with the extension axis A-A'.

As illustrated in FIG. 4, each heating element path has, for example, a different helix radius R for each heating element 26.

In an advantageous example, each heating element path has an identical helix pitch p.

In another advantageous example, the directions of rotation of each heating element path are the same.

Optionally, as illustrated in FIGS. 3 and 4, the injection device 20 further comprises tubular dividing walls 66 extending, for example, into the heating chamber 32. Each tubular dividing wall 66 forms a hollow cylinder of different radius and with a cylinder axis coinciding with the extension axis A-A'. The hollow cylinders formed by the dividing walls 66 are concentric and form annular spaces 67 between them.

The dividing walls 66 are, for example, made of stainless steel.

Each heating element 26 extends into a separate annular space 67. Each heating element 26 is radially surrounded by two tubular dividing walls 66 separating it from radially adjacent heating elements 26. The dividing walls 66 contact said heating element 26 so as to form a helical heating channel 64 between the dividing walls 66 and the heating element 26. In other words, each heating channel 64 corresponds to a space left free by the corresponding heating element 26 in the corresponding annular space 67.

A "helical" heating channel 64 means that the heating channel 64 describes a helical path. The helical path of each heating channel 64 is inherently dependent on the heating element path of the corresponding heating element 26. Indeed, the helical path of each heating channel 64 has the same helix radius and helix pitch as that of the corresponding heating element path but is axially offset along the H-H' helix axis.

The fluid flowing inside a heating channel 64 is thus surrounded radially by two dividing walls 66 and axially by the jacket 60 of the heating element 26 defining said heating channel 64. The jacket 60 of the heating element 26 axially surrounding said heating channel 64 constitutes a heat exchange surface between the heating element 26 and the fluid flowing in said heating channel 64. The elongated, helical shape of the heating elements 26 and thus of the heating channels 64 considerably enlarges this heat exchange surface, making the heating of the fluid that much more efficient.

The second injection system 28 is configured to inject the heated fluid from the heating chamber 32 into the exhaust pipe 12.

For example, the second injection system 28 is configured to inject the heated fluid into the exhaust pipe 12 at the downstream end 36.

The second injection system 28 is, for example, an electromagnetic valve similar to the first injection system 24. The second injection system 28 therefore also comprises an injection port 50, a shutter 52, an elastic member 54 and an actuator 56.

The injection port 50 is located downstream of the enclosure 22. The fluid is suitable for injection into the exhaust pipe 12 through the injection port 50.

The shutter 52 is configured to be moved between a closing position for closing the port 50 and a clearing position for clearing the port 50.

The elastic member 54 is configured to bias the shutter 52 into the closing position for closing the port 50. The elastic member 54 is, for example, a spring capable of exerting a restoring force on the shutter 52 to drive it towards its closing position.

The actuator 56 is configured to move the shutter 52 from the closing position to the clearing position against the restoring force exerted by the elastic member 54.

As shown in FIG. 2, the actuator 56 and the elastic member 54 are, for example, arranged upstream of the enclosure 22.

Advantageously, the injection device 20 further comprises a thermal insulation element 70 (visible in FIGS. 3 to 5) configured to thermally insulate the heating chamber 32. The thermal insulation element 70 reduces heat leakage from the heating chamber 32 to the outside of the enclosure 22.

The thermal insulation element 70 is, for example, made of a thermally insulating material, for example, a high-temperature resistant plastic such as a phenolic resin.

For example, the thermal insulation member 70 comprises a radial wall 72 extending radially at the upstream end 35 of the enclosure 22. The radial wall 72 is interposed between the heating chamber 32 and the elements upstream of the heating chamber 32, such as the first injection system 24 and the elastic member 54 and actuator 56 of the second injection system 28. Thus, the radial wall 72 thermally isolates the first and second injection systems 24, 28 from the heating chamber 32.

For example, the thermal insulation member 70 further comprises an outer skirt 74 extending axially downstream from the radial wall 72 on an inner surface of the wall 34 of the enclosure 22. The outer skirt 74, for example, lines the inner surface of the wall 34 of the enclosure 22 and thermally insulates the heating chamber 32 from elements disposed laterally of the heating chamber 32.

The thermal insulation element 70 further comprises, for example, a central inner sleeve 76 extending into the heating chamber 32, for example, along the extension axis A-A'. The heating element path of each heating element 26 extends around the inner sleeve 76. The inner sleeve 76 fills a central space around the extension axis A-A' to force the fluid through the heating channels 64 between the upstream end 35 and the downstream end 36 of the enclosure 22.

According to the example shown in FIG. 2, the second injection system 28 further comprises a control rod 58 connected to the elastic member 54 and the shutter 52. The elastic member 54 and the actuator 56 are configured to move the shutter 52 between the closing position and the clearing position by biasing the control rod 58. The control rod 58 extends, for example, into the inner sleeve 76 between the elastic member 54 and the shutter 52.

The following describes the operation of an injection device 20 as described above.

The first injection system 24 injects fluid from the reservoir 21 into the heating chamber 32. For example, the fluid is injected into the heating chamber 32 at the upstream end 35 of the enclosure 22.

The fluid is then heated by the heating elements 26 to the heating temperature. For example, the injected fluid is heated in the heating channels 64 between the upstream end 35 and the downstream end 36. Furthermore, due to the helical path of each heating channel 64, the fluid flowing within a heating channel 64 describes a helical path between the upstream end 35 and the downstream end 36. A swirling flow of fluid is therefore created at the outlet of each heating channel 64 downstream of the enclosure 22 at the time of injection into the exhaust pipe 12. According to the advantageous example in which the direction of rotation of each heating element path is the same, the swirling flows of fluid at the outlet of each heating channel 64 add up. Such a swirling flow ensures a better dispersion of the fluid when injected into the exhaust pipe 12.

When the fluid has reached the heating temperature, the second injection system 28 injects the heated fluid from the heating chamber 32 into the exhaust pipe 12, for example from the downstream end 36 of the enclosure 22.

In a second embodiment illustrated in FIG. 5, each heating element 26 extends in a straight heating element path, for example, from the upstream end 35 to the downstream end 36 of the enclosure 22.

The fluid is intended to flow between the heating elements 26 from upstream to downstream and to be heated in contact with the jacket 60 of the heating elements 26.

The thermal insulation element 70 also comprises an internal sleeve 76 not shown in FIG. 5.

In another embodiment not shown, the injection device 20 comprises only a single heating element 26 comprising a plurality of parts, each part extending in a path which is a circular helix around the helix axis H-H'. In such a case, the single heating element 26 has a different helix radius for each part of the heating element 26. Two radially adjacent parts of the heating element 26 then have different directions of rotation. The radially adjacent heating channels 64 therefore rotate in opposite directions.

Thanks to the disclosure, the heating of the fluid is achieved by direct contact between the heating elements 26 and the fluid in the heating chamber 32 and no longer by intermediate heating of the enclosure 22. The heat exchange surface between the heating elements 26 and the fluid is enlarged, making heating more efficient.

In addition, the disclosure reduces the loss of thermal energy. This allows precise control of the power supply to the heating elements 26. This allows the fluid to be heated to high temperatures more efficiently.

The helical arrangement of the heating channels 64 provides a swirling flow of fluid, which improves its dispersion in the exhaust pipe 12 during injection.

In addition, the arrangement of the heating elements 26 within the heating chamber reduces their size. This makes it possible to create a more compact injection device 20, which facilitates its integration into a vehicle.

Furthermore, thanks to the disclosure, the heating chamber 32 is better thermally insulated from the rest of the injection device 20, which reduces heat loss. This makes it possible to use materials with a lower heat tolerance for the elements surrounding the heating chamber 32.

Finally, the number of electrical connections for the heating elements 26 is reduced. This simplifies the structure of the injection device 20.

Although various embodiments have been disclosed, a worker of ordinary skill in this art would recognize that certain modifications would come within the scope of this disclosure. For that reason, the following claims should be studied to determine the true scope and content of this disclosure.

The invention claimed is:

1. A device for injecting a fluid into an exhaust pipe, comprising:
    a fluid reservoir;
    an enclosure delimiting a fluid heating chamber;
    a first injection system configured to inject the fluid from the fluid reservoir into the fluid heating chamber;
    at least one heating element extending at least partially into the fluid heating chamber and being intended to be in contact with the fluid, the at least one heating element being configured to heat the fluid; and
    a second injection system configured to inject the heated fluid from the fluid heating chamber into the exhaust pipe, and
    wherein each heating element comprises at least one conductive element, a tubular metal jacket surrounding the at least one conductive element, and an electrical insulator between the at least one conductive element and the tubular metal jacket.

2. The injection device according to claim 1, wherein the at least one heating element comprises a plurality of heating elements.

3. The injection device according to claim 2, wherein the plurality of heating elements define heating channels, the fluid being intended to flow through the heating channels.

4. The injection device according to claim 3, wherein each heating element extends in a heating element path which is a circular helix around a helix axis.

5. The injection device according to claim 4, wherein directions of rotation of each heating element path are the same.

6. The injection device according to claim 4, comprising tubular dividing walls, each heating element being radially surrounded by two tubular dividing walls separating each heating element from radially adjacent heating elements, the tubular dividing walls contacting said heating element so as to form a helical heating channel between the tubular dividing walls and the heating element.

7. The injection device according to claim 2, wherein each heating element extends in a heating element path which is straight.

8. The injection device according to claim 1, comprising a thermal insulation element configured to thermally insulate the fluid heating chamber.

9. The injection device according to claim 8, wherein each heating element extends in a heating element path which is a circular helix around a helix axis, and wherein the thermal insulation element comprises a central inner sleeve extending into the fluid heating chamber, the heating element path of each heating element extending around the central inner sleeve.

10. An exhaust system of a vehicle, comprising:
    a treatment device for catalytic treatment of exhaust gases;
    an exhaust pipe connected to the treatment device, through which exhaust gases flow; and
    the injection device according to claim 1, the injection device being arranged to inject fluid into the exhaust pipe upstream of the treatment device.

* * * * *